(12) United States Patent
Conner et al.

(10) Patent No.: US 7,671,150 B2
(45) Date of Patent: Mar. 2, 2010

(54) POLYMERIZATION OF ACYCLIC ALIPHATIC OLEFINS

(75) Inventors: David M. Conner, Bethlehem, PA (US); Brian Leslie Goodall, Seattle, WA (US); Lester Howard McIntosh, III, Green Lane, PA (US)

(73) Assignee: Rohm and Haas Company, Philadelphia, PA (US)

( * ) Notice: Subject to any disclaimer, the term of this patent is extended or adjusted under 35 U.S.C. 154(b) by 38 days.

(21) Appl. No.: 12/070,632

(22) Filed: Feb. 20, 2008

(65) Prior Publication Data

US 2008/0207855 A1 Aug. 28, 2008

Related U.S. Application Data

(60) Provisional application No. 60/892,008, filed on Feb. 28, 2007.

(51) Int. Cl.
C08F 4/80 (2006.01)
B01J 31/12 (2006.01)

(52) U.S. Cl. .................. 526/172; 526/348; 502/162; 502/168

(58) Field of Classification Search ............... 502/162, 502/168; 526/145, 172
See application file for complete search history.

(56) References Cited

U.S. PATENT DOCUMENTS

| | | | |
|---|---|---|---|
| 4,689,437 A | | 8/1987 | Murray |
| 4,698,403 A | | 10/1987 | Klabunde |
| 4,855,400 A | * | 8/1989 | van Broekhoven et al. .. 528/392 |
| 6,060,569 A | | 5/2000 | Bennett et al. |
| 6,417,303 B1 | | 7/2002 | Stibrany et al. |
| 2002/0037982 A1 | | 3/2002 | Johnson et al. |
| 2004/0097672 A1 | | 5/2004 | Claverie et al. |

FOREIGN PATENT DOCUMENTS

| | | |
|---|---|---|
| EP | 0 280 380 A2 | 8/1988 |
| EP | 0 589 527 B1 | 3/1994 |
| EP | 1 508 577 A1 | 2/2005 |
| EP | 1760097 A | 2/2008 |
| WO | WO 00/06615 A1 | 2/2000 |

OTHER PUBLICATIONS

Drent, et al., "Palladium catalysed copolymerization . . . ", Chemcom, Royal Society of Chemistry, No. 7, pp. 744-745 (2002).
Younkin, et al., "Neutral, Single-Component Nickel (II) Polyolefin Catalysts That Tolerate Heteroatoms", Science vol. 287, pp. 460-462 (Jan. 21, 2000).
Meking et al: Mechanistic Studies of The Palladium-Catalyzed . . . , Journal of the American Chemical Society, American Chemical Society, vol. 120, Jan. 27, 1998, pp. 888-899.
Popeney C et al: "Ligand Electronic Effects On Late Transition Metal Polymerization Catalysts", Organometallics, ACS, vol. 24, No. 6, Mar. 14, 2005, pp. 1145-1155.
Hearley A K et al: "New Single-Site Palladium Catalysts For The Nonalternating . . . ", Organometallics, ACS, vol. 24, No. 11, May 23, 2005, pp. 2755-2763.
Drent,et al, Palladium catalysed copolymerization of ethene with alkylacrylates:polar commonomer built into the linear polymer chain,Chem.Commun.pp. 744-745 (2002).
Schultz et al., Palladium(II)Complexes with Chelating P,O-Ligands as Catalysts for the Heck Reaction, Synthesis No. 6, pp. 1005-1011 (2005).
Katho,et al., Formation and Solid State Structures of Highly Crystalline Guanidinium Salts of Sulfonated Tertiary Phosphanes, Adv. Synth.Catal.No. 3/4,pp. 278-282 (2002).
Genet, et al., Recent developments of palladium(0) catalyzed reactions in aqueous medium, J. Organometallic Chemistry, vol. 576, Issues 1 2 pp. 305-317 (1999).

* cited by examiner

*Primary Examiner*—Caixia Lu
(74) *Attorney, Agent, or Firm*—Thomas S. Deibert

(57) ABSTRACT

A robust, impurity tolerant method of making substantially linear polymers of acyclic aliphatic olefins using catalyst complexes comprising a single palladium metal center and a substituted tri-aryl ligand is disclosed.

6 Claims, No Drawings

POLYMERIZATION OF ACYCLIC ALIPHATIC OLEFINS

This application claims the benefit of priority under 35 U.S.C. §119(e) of Provisional Patent Application 60/892,008 filed on Feb. 28, 2007.

This invention was made with United States Government support under ATP Award No. 70NANB4H3014 awarded by the National Institute of Standards and Technology (NIST). The United States Government has certain rights in the invention.

The present invention relates to a robust, impurity tolerant method of making substantially linear polymers of acyclic aliphatic olefins using catalyst complexes comprising a single palladium metal center and a substituted tri-aryl ligand.

Polymers of acyclic alpha olefin monomers (e.g., ethylene) are of significant commercial importance and are used in a variety of applications. Low molecular weight polyethylenes are used as, for example, lubricants and in waxes. Higher molecular weight polyethylene grades are used in, for example, fibers, films and molding resins. In most conventional applications, ethylene is polymerized with the aid of a catalyst, typically a transition metal compound or complex. These catalysts vary in cost, for example, per unit weight of polymer produced, the structure of the polymer produced, the possible need to remove the catalyst from the polymer product and the toxicity of the catalyst. Given the commercial importance of polymers of acyclic alpha olefins, new polymerization catalysts are constantly being sought.

One class of catalysts for the polymerization of ethylene is disclosed by Bennett, et al. in U.S. Pat. No. 6,060,569. Bennett, et al. disclose a process for the polymerization of ethylene, comprising, contacting, at a temperature of about −20° C. to about 200° C., ethylene, optionally a Lewis acid, and a compound of the formula

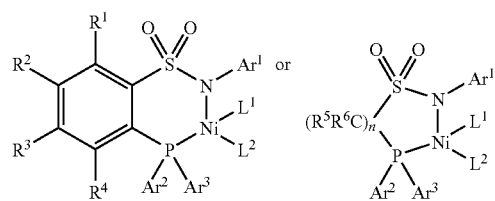

wherein: $R_1, R_2, R_3$, and $R_4$ are each independently hydrogen, hydrocarbyl, substituted hydrocarbyl, or an inert functional group; $R_5$ and $R_6$ are each independently hydrogen, hydrocarbyl or substituted hydrocarbyl; n is 1, 2 or 3; $Ar_1$ is aryl or substituted aryl; $Ar_2$ and $Ar_3$ are each independently hydrocarbyl or substituted hydrocarbyl; $L_1$ is a neutral monodentate ligand and $L_2$ is a monoanionic monodentate ligand, or $L_1$ and $L_2$ taken together are a monoanionic bidentate ligand, provided that said monoanionic monodentate ligand or said monoanionic bidentate ligand may be displaced by said ethylene or add to said ethylene.

Another class of catalysts for the polymerization of ethylene and, optionally, one or more other olefin monomers is disclosed in International Publication Number WO 00/06615 to Drent, et al. Drent, et al. disclose a group of palladium catalyst complexes comprising a palladium metal center complexed with an anion derived from an acid having a $pK_a$ of less than 3, and containing an atom of Group VA of the Periodic Table of Elements, wherein the Group VA atom is substituted with at least one aryl group, said aryl group being substituted with a polar group on the ortho position.

Notwithstanding, there remains a need for methods of making substantially linear polymers from acyclic aliphatic olefins using catalyst complexes that are robust, i.e., tolerant of impurities present in the raw materials or equipment used to prepare the polymers.

In one aspect of the present invention, there is provided a polymerization process for preparing a polymer, comprising contacting at least one acyclic aliphatic olefin monomer and a catalyst composition comprising a palladium metal center complexed with at least one ligand, wherein the at least one ligand has a structure according to Formula I

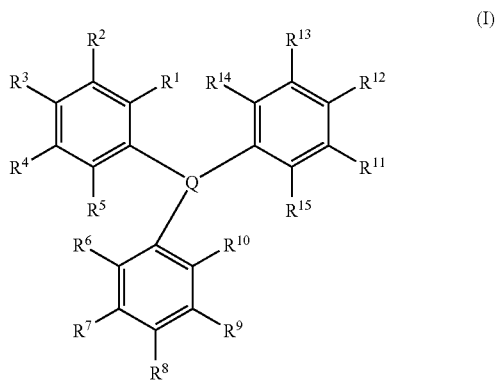

wherein $R^1$—$R^{14}$ are independently selected from a hydrogen; a halogen; and, a substituent selected from $C_1$-$C_{20}$ alkyl, $C_3$-$C_{20}$ cycloalkyl, $C_2$-$C_{20}$ alkenyl, $C_2$-$C_{20}$ alkynyl, aryl, arylalky alkylaryl, phenyl, biphenyl, $C_1$-$C_{20}$ carboxylate, $C_1$-$C_{20}$ atkoxy, $C_2$-$C_{20}$ alkenyloxy, $C_2$-$C_{20}$ alkynyloxy, aryloxy, $C_2$-$C_{20}$ alkoxycarbonyl, $C_1$-$C_{20}$ alkylthio, $C_1$-$C_{20}$ alkylsulfonyl, $C_1$-$C_{20}$ alkylsulfinyl, silyl and derivatives thereof; wherein Q is selected from phosphorus and arsenic; wherein $R^{15}$ is selected from —$SO_3$, —$PO_3$, —$AsO_3$, and —$C(CF_3)_2O$; wherein the polymer prepared exhibits a branch content of ≦15 branched/1,000 carbon atoms, wherein the branch content is determined by Carbon 13 NMR and the melting point of the polymer prepared; with the proviso that $R^1$—$R^{10}$ are not all hydrogen; with the proviso that when $R^2$, $R^4$, $R^7$ and $R^9$ are each a hydrogen, none of $R^1$, $R^5$, $R^6$ and $R^{10}$ are $CH_3$, $CF_3$, F, $SMe_2$, biphenyl or phenoxy; and, with the proviso that when $R^{15}$ is —$SO_3$, —$PO_3$, or —$AsO_3$, none of $R^1$, $R^5$, $R^6$ and $R^{10}$ is a polar group.

In another aspect of the present invention, there is provided a polymerization process for preparing a polymer, comprising contacting at least one acyclic aliphatic olefin monomer and a catalyst composition comprising a palladium metal center complexed with at least one ligand, wherein the at least one ligand has a structure according to Formula I

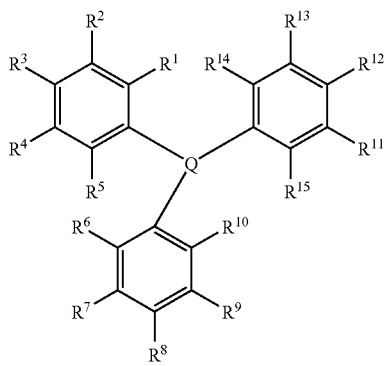

(I)

wherein $R^1$—$R^{14}$ are independently selected from a hydrogen; a halogen; and, a substituent selected from $C_1$-$C_{20}$ alkyl, $C_3$-$C_{20}$ cycloalkyl, $C_2$-$C_{20}$ alkenyl, $C_2$-$C_{20}$ alkynyl, aryl, arylalkyalkylaryl, phenyl, biphenyl, $C_1$-$C_{20}$ carboxylate, $C_1$-$C_{20}$ alkoxy, $C_2$-$C_{20}$ alkenyloxy, $C_2$-$C_{20}$ alkynyloxy, aryloxy, $C_2$-$C_{20}$ alkoxycarbonyl, $C_1$-$C_{20}$ alkylthio, $C_1$-$C_{20}$ alkylsulfonyl, $C_1$-$C_{20}$ alkylsulfinyl, silyl and derivatives thereof; wherein Q is selected from phosphorus and arsenic; wherein $R^{15}$ is selected from —$SO_3$, —$PO_3$, —$AsO_3$, and —$C(CF_3)_2O$; wherein the polymer prepared exhibits a branch content of $\leq 15$ branched/1,000 carbon atoms, wherein the branch content is determined by Carbon 13 NMR and the melting point of the polymer prepared; wherein the polymer prepared exhibits a number average molecular weight, $M_n$, of $\geq 21,200$; with the proviso that $R^1$—$R^{10}$ are not all hydrogen; with the proviso that when $R^2$, $R^4$, $R^7$ and $R^9$ are each a hydrogen, none of $R^1$, $R^5$, $R^6$ and $R^{10}$ are $CH_3$, $CF_3$, F, $SMe_2$, biphenyl or phenoxy; and, with the proviso that when $R^{15}$ is —$SO_3$, —$PO_3$, or —$AsO_3$, none of $R^1$, $R^5$, $R^6$ and $R^{10}$ is a polar group.

The term "labile neutral electron donor ligand" as used herein and in the appended claims refers to any ligand that is not strongly bound to the metal center, M, such that it is easily displaced from the metal center; and when separated from the metal center in its closed shell electron configuration exhibits a neutral charge.

The term "polar groups" as used herein and in the appended claims refers to a group of atoms wherein the bond between the group of atoms and the remainder of the molecule is between a carbon atom and a heteroatom selected from nitrogen, oxygen and sulfur.

In some embodiments of the present invention, the at least one acyclic aliphatic olefin monomer is a $C_2$-$C_{20}$ acyclic aliphatic olefin monomer. In some aspects of these embodiments, the at least one acyclic aliphatic olefin monomer is ethylene.

In some embodiments of the present invention, the catalyst composition comprises a palladium metal center complexed with at least one ligand, wherein the at least one ligand has a structure according to Formula I; wherein $R^1$—$R^{14}$ are independently selected from a hydrogen; a halogen; and, a substituent selected from $C_1$-$C_{20}$ alkyl, $C_3$-$C_{20}$ cycloalkyl, $C_2$-$C_{20}$ alkenyl, $C_2$-$C_{20}$ alkynyl, aryl, arylalkyl, alkylaryl, phenyl, biphenyl, $C_1$-$C_{20}$ carboxylate, $C_1$-$C_{20}$ alkoxy, $C_2$-$C_{20}$ alkenyloxy, $C_2$-$C_{20}$ alkynyloxy, aryloxy, $C_2$-$C_{20}$ alkoxycarbonyl, $C_1$-$C_{20}$ alkylthio, $C_1$-$C_{20}$ alkylsulfonyl, $C_1$-$C_{20}$ alkylsulfinyl, silyl and derivatives thereof; wherein Q is selected from phosphorus and arsenic; wherein $R^{15}$ is selected from —$SO_3$, —$PO_3$, —$AsO_3$, —$C(CF_3)_2O$; alternatively wherein $R^{15}$ is —$SO_3$; with the proviso that $R^1$—$R^{10}$ are not all hydrogen; with the proviso that when $R^2$, $R^4$, $R^7$ and $R^9$ are each a hydrogen, none of $R^1$, $R^5$, $R^6$ and $R^{10}$ are $CH_3$, $CF_3$, F, $SMe_2$, biphenyl or phenoxy; and, with the proviso that when $R^{15}$ is —$SO_3$, —$PO_3$, or —$AsO_3$, none of $R^1$, $R^5$, $R^6$ and $R^{10}$ are a polar group.

In some embodiments of the present invention, Q is selected from phosphorus and arsenic. In some aspects of these embodiments, Q is phosphorus. In some aspects of these embodiments, Q is arsenic.

In some embodiments of the present invention, none of $R^1$, $R^5$, $R^6$ and $R^{10}$ is selected from $CH_3$, $CF_3$, F, $SMe_2$, biphenyl and phenoxy.

In some embodiments of the present invention, two or more adjacent R groups selected from $R^1$—$R^5$ may be linked to form a substituted or unsubstituted, saturated or unsaturated ring structure.

In some embodiments of the present invention, two or more adjacent R groups selected from $R^6$—$R^{10}$ may be linked to form a substituted or unsubstituted, saturated or unsaturated ring structure.

In some embodiments of the present invention, two or more adjacent R groups selected from $R^{11}$—$R^{14}$ may be linked to form a substituted or unsubstituted, saturated or unsaturated ring structure.

In some embodiments of the present invention, at least one of $R^1$, $R^5$, $R^6$ and $R^{10}$ is selected from a phenyl and a derivative thereof. In some aspects of these embodiments, at least one of $R^1$, $R^5$, $R^6$ and $R^{10}$ is an ortho substituted phenyl. In some aspects of these embodiments, the ortho substituted phenyl is 2,6-$R^{16}R^{17}$-phenyl, wherein $R^{16}$ and $R^{17}$ are independently selected from hydrogen, halogen, $C_1$-$C_{20}$ alkyl, $C_3$-$C_{20}$ cycloalkyl, $C_2$-$C_{20}$ alkenyl, $C_2$-$C_{20}$ alkynyl, aryl, arylalkyl, alkylaryl, phenyl, biphenyl, $C_1$-$C_{20}$ carboxylate, $C_1$-$C_{20}$ alkoxy, $C_2$-$C_{20}$ alkenyloxy, $C_2$-$C_{20}$ alkynyloxy, aryloxy, $C_2$-$C_{20}$ alkoxycarbonyl, $C_1$-$C_{20}$ alkylthio, $C_1$-$C_{20}$ alkylsulfonyl, $C_1$-$C_{20}$ alkylsulfinyl, silyl and derivatives thereof. In some aspects of these embodiments, the derivatives of the foregoing groups may include such groups optionally substituted with hydrocarbyl and/or heteroatom substituents selected from linear or branched $C_1$-$C_5$ alkyl, linear or branched $C_1$-$C_5$ haloalkyl, linear or branched $C_2$-$C_5$ alkenyl and haloalkenyl, halogen, sulfur, oxygen, nitrogen, phosphorus and phenyl, optionally substituted with linear or branched $C_1$-$C_5$ alkyl, linear or branched $C_1$-$C_5$ haloalkyl and halogen. In some aspects of these embodiments, the cycloalkyl and cycloalkenyl groups may be monocyclic or multicyclic. In some aspects of these embodiments, the aryl groups may comprise a single ring (e.g., phenyl) or a fused ring system (e.g., naphthyl, anthracenyl). In some aspects of these embodiments, the cycloalkyl, cycloalkenyl and aryl groups may be taken together to form a fused ring system. In some aspects of these embodiments, each of the monocyclic and multicyclic ring systems may optionally be monosubstituted or multisubstituted with a substituent independently selected from hydrogen, linear and branched $C_1$-$C_5$ alkyl, linear and branched $C_1$-$C_5$ haloalkyl, linear and branched $C_1$-$C_5$ alkoxy, chlorine, fluorine, iodine, bromine, $C_5$-$C_{10}$ cycloalkyl, $C_6$-$C_{15}$ cycloalkenyl and $C_6$-$C_{30}$ aryl.

In some embodiments of the present invention, at least one of $R^1$, $R^5$, $R^6$ and $R^{10}$ is 2,6-dimethoxy phenyl. In some aspects of these embodiments, $R^{13}$ is a methyl, $R^1$ or $R^5$ is a 2,6-dimethoxy phenyl; and $R^6$ or $R^{10}$ is a 2,6-dimethoxy phenyl.

In some embodiments of the present invention, $R^{15}$ is —$SO_3$.

In some embodiments of the present invention, the catalyst composition is prepared as a discrete complex according to Formula II

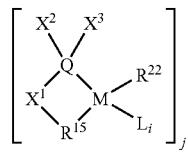

(II)

wherein j=1 or 2; i=0 or 1; and j+i=2; wherein $R^{22}$ is selected from H and a hydrocarbyl radical; preferably $R^{22}$ is selected from H, a $C_{1-20}$ cyclic hydrocarbyl radical and a $C_{1-20}$ aliphatic hydrocarbyl radical; wherein L is a labile neutral electron donor ligand; and, wherein Q is selected from phosphorus and arsenic; wherein M is selected from Ni and Pd; wherein $R^{15}$ is selected from $-SO_3$, $-PO_3$, $-AsO_3$, and $-C(CF_3)_2O$; wherein $X^1$, $X^2$ and $X^3$ are as described supra; with the proviso that when j=2; i=0 and each $R^{15}$ is bound to both metal centers, M. In some aspects of these embodiments, L is selected from pyridine; substituted pyridines; nitrile (e.g., acetonitrile); substituted nitrile; ammonia; alkyl amines; substituted alkyl amines; aryl amines; substituted aryl amines; water; alkyl phosphines; substituted alkyl phosphines; aryl phosphines; substituted aryl phosphines; alkyl phosphites; substituted alkyl phosphites; aryl phosphites; substituted aryl phosphites; cyclic olefins (e.g., cyclooctadiene, cyclooctatetraene, norbornadiene and dicyclopentadiene); substituted cyclic olefins; aliphatic ethers; substituted aliphatic ethers; cyclic ethers; substituted cyclic ethers; acetates; substituted acetates; ketones and substituted ketones. In some aspects of these embodiments, L is selected from pyridine, substituted pyridines and ammonia. In some aspects of these embodiments, L is selected from pyridine and substituted pyridines.

In some embodiments of the present invention, the catalyst composition is prepared in situ by reacting a ligand having a structure according to Formula I with a palladium salt. In some aspects of these embodiments, the ligand having a structure according to Formula I is used in an acid or salt form, wherein $R^{15}$ further comprises a proton or a cation which reacts with the palladium salt to form the catalyst composition. In some aspects of these embodiments, $R^{15}$ is selected from $-SO_3E$, $-PO_3E$, $-AsO_3E$, and $-C(CF_3)_2OE$; wherein E is selected from H, Na, K, Ag and an ammonium.

In some embodiments of the present invention, the polymerization temperature is 0 to 200° C. In some aspects of these embodiments, the polymerization temperature is 10 to 180° C. In some aspects of these embodiments, the polymerization temperature is 30 to 150° C. In some aspects of these embodiments, the polymerization temperature is 60 to 120° C.

In some embodiments of the present invention, the catalyst composition is exposed during the polymerization process to at least one impurity selected from acetylene, oxygen and water, wherein the at least one impurity is present at a level of >5 ppm. at a level of >5 ppm. In some aspects of these embodiments, the catalyst composition is exposed during the polymerization process to at least one impurity selected from acetylene, oxygen and water, wherein the at least one impurity is present at a level of >10 ppm. In some aspects of these embodiments, the catalyst composition is exposed during the polymerization process to at least one impurity selected from acetylene, oxygen and water, wherein the at least one impurity is present at a level of >20 ppm. The impurity present during the polymerization can be introduced as a contaiminant in one of the reactants and/or through exposure of the internal reactor space to atmosphere (e.g., when opening vessels for maintenance).

In some embodiments of the present invention, the catalyst composition exhibits a productivity of ≧100 kg/g of metal. In some aspects of these embodiments, the catalyst composition exhibits a productivity of ≧125 kg/g. In some aspects of these embodiments, the catalyst composition exhibits a productivity of ≧150 kg/g. In some aspects of these embodiments, the catalyst composition exhibits a productivity of ≧175 kg/g.

In some embodiments of the present invention, the polymer produced is substantially linear. In some aspects of these embodiments, the polymer produced has a branch content of ≦15 branches/1,000 carbon atoms. In some aspects of these embodiments, the polymer produced has a branch content of ≦10 branches/1,000 carbon atoms. In some aspects of these embodiments, the polymer produced has a branch content of ≦5 branches/1,000 carbon atoms. In some aspects of these embodiments, the polymer produced has a branch content of ≦1 branch/1,000 carbon atoms. In some aspects of these embodiments, the polymer produced has a branch content between 0.5 and 15 branches/1,000 carbon atoms; alternatively between 0.5 and 5 branches/1,000 carbon atoms. In some aspects of these embodiments, the branches contain at least two carbon atoms. The branching content of the copolymer is determined by Carbon 13 NMR and the melting point temperature of the copolymer.

In some embodiments of the present invention, the polymer produced exhibits a number average molecular weight, $M_n$, of ≧25,000. In some aspects of these embodiments, the polymer produced exhibits a number average molecular weight, $M_n$, of ≧50,000. In some aspects of these embodiments, the polymer produced exhibits a number average molecular weight, $M_n$, of ≧100,000. In some aspects of these embodiments, the polymer produced exhibits a number average molecular weight, $M_n$, of ≧200,000. In some aspects of these embodiments, the polymer produced exhibits a number average molecular weight, $M_n$, of ≧500,000. In some aspects of these embodiments, the polymer produced exhibits a number average molecular weight, $M_n$, of ≧1,000,000. In some aspects of these embodiments, the polymer produced has a number average molecular weight, $M_n$, of 25,000 to 5,000,000. In some aspects of these embodiments, the polymer produced has a number average molecular weight, $M_n$, of 100,000 to 5,000,000. In some aspects of these embodiments, the polymer produced has a number average molecular weight, $M_n$, of 200,000 to 2,000,000.

Some embodiments of the present invention will now be described in detail in the following Examples. All fractions and percentages set forth below in the Examples are by weight unless otherwise specified. The chemical structures presented in Table 1 have been drawn according to the general rules for drawing Lewis structures of molecules as described in, for example, Brown, et al., *Organic Chemistry*, Brooks-Cole, 4th ed 2004.

EXAMPLES 1-16

Ligand Synthesis

Following the general procedure presented below using Component A and Component B identified in Table 1 in the amounts listed in Table 1, the Product Solids listed in Table 1 were prepared with the reported yield for examples 1-15, respectively.

Component A was added to a 100 mL flask ("Flask A") then placed under vacuum and refilled with nitrogen and charged with 60 mL of tetrahydrofuran (THF). Flask A was then placed in an ice bath and allowed to cool to 0° C. 10.1 mL of 2.5 molar n-BuLi was then injected. Flask A was then placed in a dry ice/acetone bath and allowed to cool to about −78° C.

A separate 500 mL Schlenk flask ("Flask B") was placed under vacuum. Flask B was purged with nitrogen and charged with ~50 mL of THF. Flask B was then placed in a dry ice/acetone bath and allowed to cool to about −78° C. 1.10 mL of $PCl_3$ was then added to Flask B with agitation. The contents of Flask A were then slowly transferred to Flask B using a cannula with vigorous agitation.

A separate 100 mL flask ("Flask C") was purged and filled with nitrogen. Flask C was then charged with ~60 mL of THF and Component B. Flask C was then placed in a dry ice/acetone bath and allowed to cool with agitation to about −78° C. 10.1 mL of 2.5 molar n-BuLi was added to Flask C and allowed to react for about 15 minutes. The contents of Flask C were then transferred to Flask B, maintained at −78° C., using a cannula with continued vigorous agitation. Following the complete addition of the contents of Flask C into Flask B, Flask B was allowed to warm to room temperature for about 30 minutes. The contents of Flask B were then poured into a 500 mL recovery flask (Flask D) and the THF was removed, leaving a solid. The solid in Flask D was then mixed with distilled water and then transferred to a separation flask (Flask E). 100 mL of $CH_2Cl_2$ was added to the contents of Flask E. Flask E was shaken to mix the two layers. About 5 mL of concentrated HCl was then added to Flask E. Flask E wash shaken again. The mixture in Flask E was then allowed to settle, forming two layers—an organic phase on the bottom and a aqueous phase on the top. The organic layer was collected. The aqueous phase was washed with 50 mL of $CH_2Cl_2$. The organic wash material was collected and added to the previously collected organic layer material. The combined organic material was then contacted with $MgSO_4$ and rotovaped to dryness, leaving a solid. The solid was then washed first with diethyl ether and then with THF to remove impurities. The washed Product Solid was collected by filtration with the yield reported in Table 1.

TABLE 1

| Ex# | Component A | Component B | Product Solid/Yield | |
|---|---|---|---|---|
| | | | Chemical Name | Structure |
| 1 | benzene sulfonic acid (2.10 g) | 2',6'dimethoxy-2-biphenylbromide (7.45 g) | 2-(bis-(2',6'dimethoxy-2-biphenyl) phosphino) benzene sulfonic acid (~5 g) | Structure I |
| 2 | benzene sulfonic acid (2.10 g) | 2-bromoethylbenzene (4.7 g) | 2-(bis (2-ethylphenyl) phosphino) benzene sulfonic acid (~2 g) | Structure II |

TABLE 1-continued

|  |  |  | Product Solid/Yield | |
| --- | --- | --- | --- | --- |
| Ex# | Component A | Component B | Chemical Name | Structure |
| 3 | benzene sulfonic acid (2.10 g) | 4-bromo-N,N-dimethylaniline (5.1 g) | 2-(bis(4-dimethylaminophenyl) phosphino benzene sulfonic acid (~2 g) | Structure III |
| 4 | napthalenesulfonic acid (2.63 g) | 2-bromoanisole (4.75 g) | 2-(bis (2-methoxyphenyl) phosphino) napthalene sulfonic acid (~1.5 g) | Structure IV |
| 5 | benzene sulfonic acid (2.10 g) | 2-bromo-naphthalene (5.25 g) | 2-(bis (2-naphthalenyl) phosphino) benzene sulfonic acid (~2 g) | Structure V |
| 6 | benzene sulfonic acid (2.10 g) | Ferrocene (4.7 g) | 2-bis(ferrocenyl) phosphino) benzene sulfonic acid (~2 g) | Structure VI |

TABLE 1-continued

| | | | Product Solid/Yield | |
|---|---|---|---|---|
| Ex# | Component A | Component B | Chemical Name | Structure |
| 7 | benzene sulfonic acid (2.10 g) | Bromo-2,4,6-trimethoxybenzene (6.25 g) | 2-(bis(2,4,6-trimethoxyphenyl) phosphino) benzene sulfonic acid (~2 g) | Structure VII |
| 8 | benzene sulfonic acid (2.10 g) | Bromo-2,4,-dimethoxybenzene (5.5 g) | 2-(bis(2,4,-dimethoxy phenyl) phosphino) benzene sulfonic acid (~2 g) | Structure VIII |
| 9 | benzene sulfonic acid (2.10 g) | Mesitylbromide (5.04 g) | 2-(bis(mesityl) phosphino) benzene sulfonic acid (~2 g) | Structure IX |
| 10 | napthalenesulfonic acid (2.63 g) | Mesitylbromide (5.04 g) | 2-(bis(mesityl) phosphino) napthalene sulfonic acid (~2.5 g) | Structure X |

TABLE 1-continued

| Ex# | Component A | Component B | Product Solid/Yield | |
|---|---|---|---|---|
| | | | Chemical Name | Structure |
| 11 | benzene sulfonic acid (2.10 g) | 2-bromobiphenyl (5.9 g) | 2-(bis (2-biphenyl) phosphino) benzene sulfonic acid (~2 g) | Structure XI |
| 12 | benzene sulfonic acid (2.10 g) | 3,5-di-t-butyl-bromobenzene (6.81 g) | 2-(bis (3,5-di-t-butyl-phenyl) phosphino) benzene sulfonic acid (~2 g) | Structure XII |
| 13 | benzoic acid (2.10 g) | 2',6'dimethoxy-2-biphenylbromide (7.45 g) | 2-(bis (2',6'dimethoxy-2-biphenyl) phosphino) benzoic acid (~5 g) | Structure XIII |
| 14 | 4-nitrobenzene sulfonic acid (2.10 g) | 2-bromoanisole (4.75 g) | 2-(Bis(2-methoxy-phenyl)-phosphanyl)-4-nitro-benzenesulfonic acid (~2 g) | Structure XIV |

TABLE 1-continued

| Ex# | Component A | Component B | Chemical Name | Product Solid/Yield Structure |
|---|---|---|---|---|
| 15 | benzene sulfonic acid (2.10 g) | Bromocyclohexane (4.13 g) | 2-Dicyclohexyl phosphanyl- benzenesulfonic acid (~2 g) | Structure XV 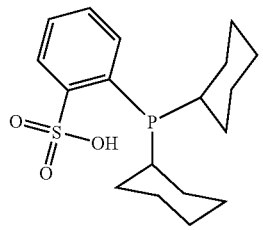 |

EXAMPLE 16

Synthesis of a Potassium Salt of the Ligand of Structure VI

A 0.45 g (0.81 mmol) sample of Product Solid (i.e., ligand Structure VI) prepared according to Example 6 was added to 50 mL of THF in a reaction flask with vigorous agitation to form a ligand solution. In a separate container, 0.10 g (0.88 mmol) of potassium tert-butoxide was dissolved in 20 mL of THF. The resulting potassium tert-butoxide solution was then added dropwise to the contents of the reaction flask with agitation. Following the addition of the potassium tert-butoxide solution, the contents of the reaction flask were reduced by vacuum extraction of some of the THF solvent leaving approximately 25 mL of product solution in the reaction flask. A potassium salt of the ligand was then precipitated from the remaining product solution through the addition of 20 mL of pentane. The precipitated potassium salt of the ligand was recovered by filtration through a fine porosity frit and washed with pentane 3×20 mL. The potassium salt of the ligand was then subjected to vacuum to remove the remaining volatiles, leaving a dark orange Product Powder 0.40 g (0.67 mmol, 83%).

EXAMPLE 17

Synthesis of a Silver Salt of the Ligand of Structure VII

A 0.75 g (1.43 mmol) sample of the Product Solid (i.e., ligand Structure VII) prepared according to Example 7 was added to 50 mL of methanol in a reaction flask with vigorous agitation. In a separate container, 0.23 g (1.36 mmol) of silver nitrate was dissolved in 50 mL of deionized water. The resulting silver nitrate solution was then added dropwise to the contents of the reaction flask with vigorous agitation. Agitation of the contents of the reaction flask was continued for 20 minutes following addition of the silver nitrate solution. The contents of the reaction flask were then reduced by vacuum extraction of some of the solvent leaving approximately 50 mL and resulting in the formation of a gray precipitate. The precipitate was recovered by filtration through a fine porosity frit and washed with water 2×20 mL. The silver salt of the ligand was then dried under reduced pressure, leaving a dark gray Product Powder (0.35 g, 0.62 mmol, 44%).

EXAMPLES 18-31

Preparation Transition Metal Catalyst Complexes

A sample of Component A identified in Table 2 was added to 30 mL of tetrahydrofuran in a reaction flask with agitation. To the contents of the reaction flask was then added Component B identified in Table 2, with continued agitation. The contents of the reaction flask were then agitated for 30 minutes before adding Component C identified in Table 2. The contents of the reaction flask were then reduced under vacuum and pentane was added to precipitate the product catalyst complex. The product catalyst complex was collected by filtration through a fine porosity frit and washed with pentane 2×20 mL. The product catalyst complex was then subjected to vacuum to remove the remaining volatiles, leaving the Product Yield reported in Table 2.

TABLE 2

| Ex. # | Component A | Component B | Component C | Product Yield |
|---|---|---|---|---|
| 18 | Product Solid prepared according to Example 1 (0.943 g) | dimethyl tetramethylethylene diamine palladium (II) (0.388 g) | Pyridine (~0.2 ml) | 940 mg |
| 19 | Product Solid prepared according to Example 2 (340 mg) | dimethyl tetramethylethylene diamine palladium (II) (200 mg) | Pyridine (~0.2 ml) | 440 mg |
| 20 | Product Solid prepared according to Example 3 (79 mg) | dimethyl tetramethylethylene diamine palladium (II) (50 mg) | Pyridine (~0.2 ml) | 87 mg |

TABLE 2-continued

| Ex. # | Component A | Component B | Component C | Product Yield |
|---|---|---|---|---|
| 21 | Product Solid prepared according to Example 4 (45 mg) | dimethyl tetramethylethylene diamine palladium (II) (25 mg) | Pyridine (~0.2 ml) | 33 mg |
| 22 | Product Solid prepared according to Example 5 (44 mg) | dimethyl tetramethylethylene diamine palladium (II) (25 mg) | Pyridine (~0.2 ml) | 41 mg |
| 23 | Product Solid prepared according to Example 8 (0.370 g) | dimethyl tetramethylethylene diamine palladium (II) (0.200 g) | Pyridine (~0.2 ml) | 440 mg |
| 24 | Product Solid prepared according to Example 9 (0.640 g) | dimethyl tetramethylethylene diamine palladium (II) (0.350 g) | Pyridine (~0.2 ml) | 700 mg |
| 25 | Product Solid prepared according to Example 11 (0.396 g) | dimethyl tetramethylethylene diamine palladium (II) (0.200 g) | Pyridine (~0.2 ml) | 540 mg |
| 26 | Product Solid prepared according to Example 12 (0.2272 g) | dimethyl tetramethylethylene diamine palladium (II) (0.100 g) | Pyridine (~0.2 ml) | 320 mg |
| 27 | Product Solid prepared according to Example 13 (210 mg) | dimethyl tetramethylethylene diamine palladium (II) (150 mg) | Pyridine (~0.2 ml) | 200 mg |
| 28 | Product Solid prepared according to Example 14 (115 mg) | dimethyl tetramethylethylene diamine palladium (II) (50 mg) | Pyridine (~0.2 ml) | 78 mg |
| 29 | Product Solid prepared according to Example 15 (83 mg) | dimethyl tetramethylethylene diamine palladium (II) (50 mg) | Pyridine (~0.2 ml) | 5 mg |
| 30 | Product Powder prepared according to Example 16 (0.135 g) | (1,5 cyclooctadiene) methyl palladium (II) triflate (0.086 g) | none | 148 mg |
| 31 | Product Powder prepared according to Example 17 (0.098 g) | chloro(1,5 cyclooctadiene) methyl palladium (II) (0.046 g) | none | 780 mg |

EXAMPLE 32

Ligand Synthesis

A first 100 mL Schlenk flask was charged with benzenesulfonic acid hydrate (1.7 g, 10.7 mmol, $C_6H_6O_3S \cdot H_2O$, 158.71 g/mol, MP Bio Medicals 98-11-3). The flask was evacuated under vacuum. The bottom of the flask was then

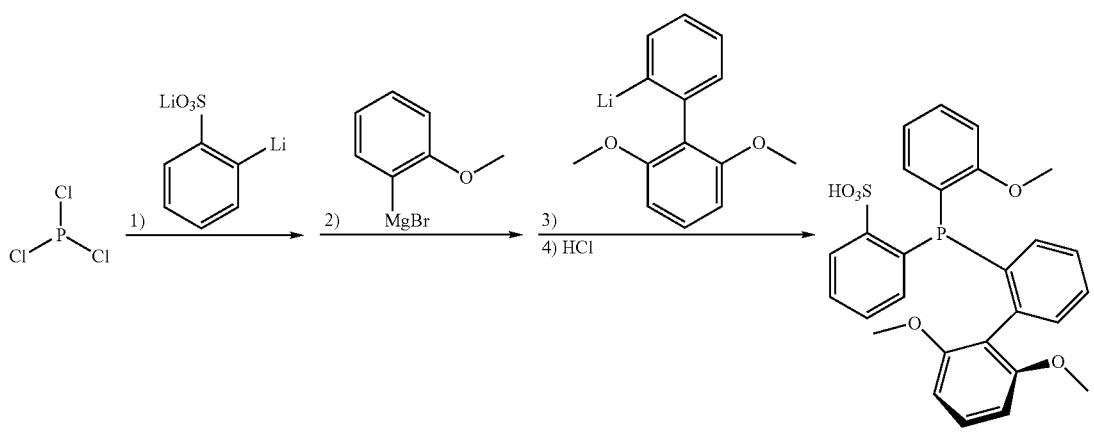

heated using a heat gun. The flask contents melted to form a brown liquid, which started bubbling. The heating was continued until the liquid started to reflux and the pressure dropped to approximately 10 mTorr. The flask was filled with nitrogen, cooled and THF (anhydrous, Acros, ~50 mL) was added to the flask forming a clear colorless solution. At 0° C., n-BuLi (2.5 M hexane solution, 11.4 mmol, 8.6 mL, Aldrich) was added to yield a beige suspension, which was stirred for 0.5 hr before being cooled at −78° C.

A second 100 mL Schlenk flask was charged with Mg (0.30 g, 0.0125 mmol, powder, Aldrich). THF (50 mL, anhydrous, Acros) and 2-bromoanisole (2.10 g, 0.0112 mmol, $C_7H_7BrO$, 187.04 g/mol, Acros) were added to the second Schlenk flask. The contents of the second Schlenk flask were sonicated (~30 sec.) and the contents were observed to exhibit a temperature rise. The mixture was stirred until it cooled back down to room temperature.

A 200 mL Schlenk flask was charged with THF (~50 mL). At −78° C., $PCl_3$ (0.93 mL, 1.47 g, 0.0107 mol, 1.574 g/mL, 137.33 g/mol, Aldrich) was added to the 200 mL Schlenk flask via syringe. The beige suspension in the first 100 mL Schlenk flask was transferred to the 200 mL Schlenk flask at −78° C. via cannula. The contents of the 200 mL Schlenk flask were then stirred for 0.5 hours while maintaining the temperature at −78° C. The contents of the second 100 mL Schlenk flask was cooled to −78° C. and transferred to the 200 mL Schlenk flask via cannula. The contents of the 200 mL Schlenk flask were then warmed to ambient temperature and stirred for about an hour to yield a yellow solution.

A 500 mL Schlenk flask was charged with 2'-Br-2,6-(Me)$_2$biphenyl (3.14 g, 10.7 mmol, $C_{14}H_{13}BrO_2$, 293.16 g/mol, Aldrich) ant THF (150 mL). The contents of the 500 mL Schlenk flask were cooled to −78° C. n-BuLi (4.3 mL, 2.5 M hexane solution, 10.7 mmol, Aldrich) at −78° C. was added to the 500 mL Schlenk flask, yielding a thick, white slurry. The 500 mL Schlenk flask was shaken by hand to ensure mixing. A 0.5 hour after the addition of the n-BuLi, the contents of the 200 mL Schlenk flask were added to the 500 mL Schlenk flask via cannula. The contents of the 500 mL Schlenk flask were then allowed to gradually warm to ambient temperature. The contents of the 500 mL Schlenk flask were stirred overnight to yield a clear yellow solution. The volatiles were removed from the 500 mL Schlenk flask under vacuum. The resulting solid was extracted using $CH_2Cl_2$ (200 mL), $H_2O$ (200 mL), HCl (concentrated, 20 mL). The organic layer from the extract was dried with $MgSO_4$ and the volatile portion of the extract was removed under vacuum to leave a pale yellow solid. The pale yellow solid was collected and washed with THF (3×15 mL) and $Et_2O$ (3×15 mL) to yield a white powder product ligand (2.3 g, 44% yield). $^1$H NMR (CDCl$_3$, ° C.): δ8.32 (m, 1H), 7.71 (q, J=8.5, 2H), 7.56 (m, 1H), 7.47-7.40 (m, 4H), 7.33-7.27 (m, 2H), 6.99 (m, 2H), 6.91 (m, 1H), 6.57 (d, J=8.5, 1H), 6.44 (d, J=8.5, 1H), 3.73 (s, 3H), 3.64 (s, 3H), 3.19 (s, 3H). $^{31}$P NMR (CDCl$_3$, ° C.): δ−7.1 (s). LC-MS: m/z=509.2.

EXAMPLE 33

Ligand Synthesis

Toluene sulfonic acid (2.05 g., 10.8 mmol) was added to a 100 mL flask ("Flask A") then placed under vacuum and refilled with nitrogen and charged with 50 mL of tetrahydrofuran (THF). Flask A was then placed in an ice bath and allowed to cool to 0° C. 8.8 mL of 2.5 molar n-Butyl Lithium (n-BuLi) was injected. Flask A was then placed in a dry ice/acetone bath and allowed to cool to about −78° C.

A separate 200 mL Schlenk flask ("Flask B") was placed under vacuum. Flask B was purged with nitrogen and charged with ~50 mL of THF. Phosphorus trichloride ($PCl_3$) (1.0 mL, 11.5 mmol) was then added to Flask B with agitation. Flask B was then placed in a dry ice/acetone bath and allowed to cool to about −78° C. The contents of Flask A were then slowly transferred to Flask B using a cannula with vigorous agitation.

A separate 500 mL flask ("Flask C") was purged and filled with nitrogen. Flask C was then charged with ~200 mL of THF and 2'-Bromo-2,6 dimethoxybiphenyl (7.26 g., 24.8 mmol). Flask C was then placed in a dry ice/acetone bath and allowed to cool with agitation to about −78° C. 10.03 mL of 2.5 molar n-BuLi was added to Flask C and allowed to react for about 10 minutes. The contents of Flask B were then transferred to Flask C, maintained at −78° C., using a cannula with continued vigorous agitation. Following the complete addition of the contents of Flask B into Flask C, Flask C was allowed to warm to room temperature for 45 min. The contents of Flask C were then poured into a 1000 mL recovery flask (Flask D) and the THF was removed, leaving a solid. The solid in Flask D was then mixed with ~150 mL of distilled water and then transferred to a separation flask (Flask E). 100 mL of Methylene Chloride ($CH_2Cl_2$) was added to the contents of Flask E. Flask E was shaken to mix the two layers. About 20 mL of concentrated HCl was then added to Flask E and was shaken again. ~20 mL of 3A alcohol was added to Flask E and was shaken again. The mixture in Flask E was then allowed to settle, forming two layers—an organic phase on the bottom and an aqueous phase on the top. The organic layer was collected. The aqueous phase was washed with 50 mL of $CH_2Cl_2$. The organic wash material was collected and added to the previously collected organic layer material. The combined organic material was then contacted with Magnesium Sulfate and rotovaped to dryness, leaving a solid. The solid was then washed with THF and diethyl ether to remove impurities. Approximately 2 g. of the washed

EXAMPLE 34

Catalyst Preparation 1.364 g ligand prepared according to Example 33 was added to ~20 mL of tetrahydrofuran (THF) in a reaction flask with agitation. To the contents of the reaction flask was then added 3.09 g tetramethylethylenediamine palladium (II) with continued agitation. The contents of the reaction flask were then agitated for approximately 1 hour. The product catalyst complex was collected by filtration through a fine porosity frit and washed with THF. The product catalyst complex was then subjected to vacuum to remove the remaining volatiles, leaving 6.98 g of white solid as the reaction product.

EXAMPLE 35

Ligand Synthesis

Toluene sulfonic acid (2.05 g., 10.8 mmol) was added to a 100 mL flask ("Flask A") then placed under vacuum and refilled with nitrogen and charged with 50 mL of tetrahydrofuran (THF). Flask A was then placed in an ice bath and allowed to cool to 0° C. 8.8 mL of 2.5 molar n-Butyl Lithium (n-BuLi) was then injected. Flask A was then placed in a dry ice/acetone bath and allowed to cool to about −78° C.

A separate 200 mL Schlenk flask ("Flask B") was placed under vacuum. Flask B was purged with nitrogen and charged with ~50 mL of THF. Phosphorus trichloride ($PCl_3$) (1.0 mL, 11.5 mmol) was then added to Flask B with agitation. Flask B was then placed in a dry ice/acetone bath and allowed to cool to about −78° C. The contents of Flask A were then slowly transferred to Flask B using a cannula with vigorous agitation.

A separate 500 mL flask ("Flask C") was purged and filled with nitrogen. Flask C was then charged with ~200 mL of THF and 2'-Bromo-2',6'-diisopropoxybiphenyl (8.66 g., 24.8 mmol). Flask C was then placed in a dry ice/acetone bath and allowed to cool with agitation to about −78° C. 10.03 mL of 2.5 molar n-BuLi was added to Flask C and allowed to react for about 10 minutes. The contents of Flask B were then transferred to Flask C, maintained at −78° C., using a cannula with continued vigorous agitation. Following the complete addition of the contents of Flask B into Flask C, Flask C was allowed to warm to room temperature for 45 min. The contents of Flask C were then poured into a 1000 mL recovery flask (Flask D) and the THF was removed, leaving a solid. The solid in Flask D was then mixed with ~150 mL of distilled water and then transferred to a separation flask (Flask E). 100 mL of Methylene Chloride ($CH_2Cl_2$) was added to the contents of Flask E. Flask E was shaken to mix the two layers. About 20 mL of concentrated HCl was then added to Flask E and was shaken again. ~20 mL of 3A alcohol was added to Flask E and was shaken again. The mixture in Flask E was then allowed to settle, forming two layers—an organic phase on the bottom and an aqueous phase on the top. The organic layer was collected. The aqueous phase was washed with 50 mL of $CH_2Cl_2$. The organic wash material was collected and added to the previously collected organic layer material. The combined organic material was then contacted with Magnesium Sulfate and rotovaped to dryness, leaving a solid. The solid was then washed with THF and diethyl ether to remove impurities. Approximately 2 g. of the washed product solid 2-[Bis-(2',6'-Diisopropoxy-biphenyl-2yl)-phosphanyl]-toluene sulfonic acid was collected by filtration.

EXAMPLE 36

Catalyst Preparation 1.61 g ligand prepared according to Example 35 was added to ~20 mL of tetrahydrofuran (THF) in a reaction flask with agitation. To the contents of the reaction flask was then added 3.09 g tetramethylethylenediamine palladium (II) with continued agitation. The contents of the reaction flask were then agitated for approximately 1 hour. The product catalyst complex was collected by filtration through a fine porosity frit and washed with THF. The product catalyst complex was then subjected to vacuum to remove the remaining volatiles, leaving 7.81 g of white solid as the reaction product.

EXAMPLE 37

Polymerization

In a nitrogen filled glovebox, a 13 mL reactor cell of an Argonaut Technologies Endeavor™ was charged with 5.0 mL toluene from a bottle of Aldrich Chromasolv® brand HPLC grade toluene (purity >99.9%, water <0.02% unopened) that was about 4 weeks old. The toluene was used out of the bottle without additional purification. The reactor cell was outfitted with anchor bladed stirring shaft and stirred at a rate of 925 rpm. The reactor cell was heated to 100° C. and charged with 400 psig ethylene gas. After temperature and pressure equilibration, 0.5 µmol of catalyst prepared according to Example 34 mixed into 0.5 mL of toluene was injected into the reactor cell followed by an additional 0.5 mL of toluene rinse. The reaction mixture was stirred for 1 hour, after which the residual ethylene was vented and the contents of the reactor cell were allowed to cool.

The contents of the reator cell were then added to 50 mL of stirred methanol. After stirring for 3 hours, the product polymer was isolated by centrifugation. The product polymer was dried under vacuum at 60° C. for 18 hours. The polymer yield was 0.500 g.

We claim:

1. A polymerization process for preparing a polymer, comprising contacting at least one acyclic aliphatic olefin monomer and a catalyst composition comprising a palladium metal center complexed with at least one ligand, wherein the at least one ligand has a structure according to Formula I

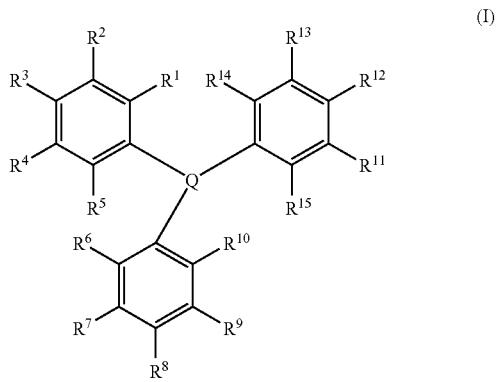

wherein $R^1$-$R^{14}$ are independently selected from a hydrogen; a halogen; and, a substituent selected from $C_1$-$C_{20}$ alkyl, $C_3$-$C_{20}$ cycloalkyl, $C_2$-$C_{20}$ alkenyl, $C_2$-$C_{20}$ alkynyl, aryl, arylalkyl, alkylaryl, phenyl, biphenyl, $C_1$-$C_{20}$ carboxylate, $C_1$-$C_{20}$ alkoxy, $C_2$-$C_{20}$ alkenyloxy, $C_2$-$C_{20}$ alkynyloxy, aryloxy, $C_2$-$C_{20}$ alkoxycarbonyl, $C_1$-$C_{20}$ alkylthio, $C_1$-$C_{20}$ alkylsulfonyl, $C_1$-$C_{20}$ alkylsulfinyl, silyl and derivatives thereof;

wherein Q is phosphorus;

wherein $R^{15}$ is —$SO_3$;

wherein the polymer prepared exhibits a branch content of ≦15 branched/1,000 carbon atoms, wherein the branch content is determined by Carbon 13 NMR and the melting point of the polymer prepared;

wherein at least one of $R^1$, $R^5$, $R^6$ and $R^{10}$ is 2,6-dimethoxy phenyl;

with the proviso that $R^1$-$R^{10}$ are not all hydrogen;

with the proviso that when $R^2$, $R^4$, $R^7$ and $R^9$ are each a hydrogen, none of $R^1$, $R^5$, $R^6$ and $R^{10}$ are $CH_3$, $CF_3$, F, $SMe_2$, biphenyl or phenoxy; and, with the proviso that none of $R^1$, $R^5$, $R^6$ and $R^{10}$ is a polar group.

2. The polymerization process of claim 1, wherein the catalyst composition is exposed during the polymerization process to at least one impurity selected from acetylene, $CO_2$, oxygen and water, wherein the at least one impurity is present at a level of >5 ppm.

3. The polymerization process of claim 2, wherein the catalyst composition exhibits a productivity of ≧100 kg/g of metal.

4. The polymerization process of claim 2, wherein the at least one acyclic aliphatic olefin monomer is ethylene.

5. The polymerization process of claim 2, wherein the polymerization temperature is 0 to 200° C.

6. A polymerization process for preparing a polymer, comprising contacting at least one acyclic aliphatic olefin monomer and a catalyst composition comprising a palladium metal center complexed with at least one ligand, wherein the at least one ligand has a structure according to Formula I

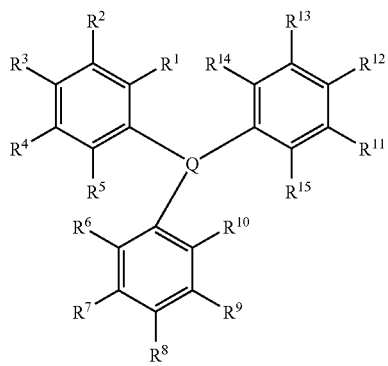

wherein $R^1$-$R^{14}$ are independently selected from a hydrogen; a halogen; and, a substituent selected from $C_1$-$C_{20}$ alkyl, $C_3$-$C_{20}$ cycloalkyl, $C_2$-$C_{20}$ alkenyl, $C_2$-$C_{20}$ alkynyl, aryl, arylalkyl, alkylary, phenyl, biphenyl, $C_1$-$C_{20}$ carboxylate, $C_2$-$C_{20}$ alkoxy, $C_2$-$C_{20}$ alkenyloxy, $C_2$-$C_{20}$ alkynyloxy, aryloxy, $C_2$-$C_{20}$ alkoxycarbonyl, $C_1$-$C_{20}$ alkylthio, $C_1$-$C_{20}$ alkylsulfonyl, $C_1$-$C_{20}$ alkylsulfinyl, silyl and derivatives thereof;

wherein Q is phosphorus;

wherein $R^{15}$ is —$SO_3$;

wherein the polymer prepared exhibits a branch content of $\leq 15$ branched/1,000 carbon atoms, wherein the branch content is determined by Carbon 13 NMR and the melting point of the polymer prepared;

wherein at least one of $R^1$, $R^5$, $R^6$ and $R^{10}$ is 2,6-dimethoxy phenyl;

wherein the polymer prepared exhibits a number average molecular weight, $M_n$, of $\geq 21,200$;

with the proviso that $R^1$-$R^{10}$ are not all hydrogen;

with the proviso that when $R^2$, $R^4$, $R^7$ and $R^9$ are each a hydrogen, none of $R^1$, $R^5$, $R^6$ and $R^{10}$ are $CH_3$, $CF_3$, F, $SMe_2$, biphenyl or phenoxy; and, with the proviso that none of $R^1$, $R^5$, $R^6$ and $R^{10}$ is a polar group.

* * * * *